US012715793B2

(12) United States Patent
Chladek et al.

(10) Patent No.: US 12,715,793 B2
(45) Date of Patent: Aug. 25, 2026

(54) SYSTEM FOR REMOVING A CONTAMINANT FROM WASTEWATER FROM AN INDUSTRIAL PLANT AND THE INDUSTRIAL PLANT INCLUDING THE SAME

(71) Applicant: YARA INTERNATIONAL ASA, Oslo (NO)

(72) Inventors: Petr Chladek, Porsgrunn (NO); Clive M. H. Brereton, Richmond (CA); Eric Robin Mielke, Vancouver (CA)

(73) Assignee: YARA INTERNATIONAL ASA, Oslo (NO)

( * ) Notice: Subject to any disclaimer, the term of this patent is extended or adjusted under 35 U.S.C. 154(b) by 479 days.

(21) Appl. No.: 18/231,531

(22) Filed: Aug. 8, 2023

(65) Prior Publication Data

US 2023/0391641 A1 Dec. 7, 2023

Related U.S. Application Data

(62) Division of application No. 17/274,157, filed as application No. PCT/EP2019/074768 on Sep. 17, 2019, now Pat. No. 11,767,240.

(30) Foreign Application Priority Data

Sep. 17, 2018 (EP) .................................... 18194743

(51) Int. Cl.
*C02F 1/44* (2023.01)
*C02F 1/467* (2023.01)
(Continued)

(52) U.S. Cl.
CPC ............ *C02F 1/445* (2013.01); *C02F 1/4674* (2013.01); *C02F 1/4678* (2013.01);
(Continued)

(58) Field of Classification Search
CPC ...... C02F 1/445; C02F 1/4674; C02F 1/4678; C02F 2101/12; C02F 2103/34; C02F 2201/461; C02F 2301/08; C02F 1/44
See application file for complete search history.

(56) References Cited

U.S. PATENT DOCUMENTS 6,132,627 A 10/2000 Joko
6,315,886 B1 11/2001 Zappi
(Continued)

FOREIGN PATENT DOCUMENTS

CN 204138483 2/2015
CN 105417801 A 3/2016
(Continued)

OTHER PUBLICATIONS

Shiqiang Zou and Zhen He, "Electrodialysis Recovery of Reverse-Fluxed Draw Solute During Forward Osmosis Water Treatment", Chemical Engineering Journal, 2017, pp. 550-558.
(Continued)

*Primary Examiner* — Hayden Brewster
(74) *Attorney, Agent, or Firm* — DILWORTH IP, LLC

(57) ABSTRACT

The present application relates to a method for removing a contaminant from wastewater from industrial fertilizer plant. The method comprises the steps of concentrating the wastewater, of electrolyzing the wastewater and of recirculating the electrolyzed wastewater to the fertilizer plant. The present application further relates to a system arranged to perform the method according to the present application.

5 Claims, 3 Drawing Sheets

(51) Int. Cl.
*C02F 103/34* (2006.01)
*C02F 101/12* (2006.01)

(52) U.S. Cl.
CPC ...... *C02F 2101/12* (2013.01); *C02F 2103/34* (2013.01); *C02F 2201/461* (2013.01); *C02F 2301/08* (2013.01)

(56) References Cited

U.S. PATENT DOCUMENTS

| | | | |
|---|---|---|---|
| 8,703,077 | B2 | 4/2014 | Chalmers |
| 2019/0313199 | A1 | 10/2019 | Laaksonen |

FOREIGN PATENT DOCUMENTS

| | | | |
|---|---|---|---|
| JP | S5113007 | | 2/1976 |
| JP | 2000051817 | A | 2/2000 |
| NC | 20180000201 | | 4/2018 |
| WO | 2005075355 | | 8/2005 |
| WO | 2015058109 | A1 | 4/2015 |
| WO | 2016201428 | | 12/2016 |
| WO | 2017103041 | A1 | 6/2017 |
| WO | 2017103042 | A1 | 6/2017 |
| WO | 18029200 | | 2/2018 |

OTHER PUBLICATIONS

Colombian Office Action (including English translation) for App. No. CONC2021/0003292, dated Jan. 18, 2022, 13 pages.
Perez, G., et al., “Electro-oxidation of reverse osmosis concentrates generated in tertiary water treatment”, Water Research, doi: https://doi.org/10.1016/j.watres.2010.02.017, Feb. 16, 2010.
Dolar, D. et al. (2011) RO/NF treatment of wastewater from fertilizer factory—removal of fluoride and phosphate. Desalination. Volume 265, Issues 1-3, Jan. 15, 2011, pp. 237-241.
Turek, D. et al.(2011) Brackish water desalination in RO-single pass EDR system, Desalination and Water Treatment, 7:1-3, 263-266.
Office Action (Non-Final Rejection) dated Dec. 8, 2022 for U.S. Appl. No. 17/274,157 (pp. 1-4).
Office Action (Notice of Allowance and Fees Due (PTOL-85)) dated May 15, 2023 for U.S. Appl. No. 17/274,157 (pp. 1-9).
Office Action (Notice of Allowance and Fees Due (PTOL-85)) dated May 31, 2023 for U.S. Appl. No. 17/274,157 (pp. 1-1).
International Search Report Issued in International Application No. PCT/EP2019/074768, Issued Nov. 19, 2019, 3 pages.
Shiqiang Zou et al., “Electrodialysis recovery of reverse-fluxed fertilizer draw solute during forward osmosis water treatment”, Chemical Engineering Journal, (Jul. 31, 2017), vol. 330, doi: 10.1016/j.cej.2017.07.181, ISSN 1385-8947, pp. 550-558, XP055526524.

SYSTEM FOR REMOVING A CONTAMINANT FROM WASTEWATER FROM AN INDUSTRIAL PLANT AND THE INDUSTRIAL PLANT INCLUDING THE SAME

TECHNICAL FIELD

This application relates to a novel system and method for treating concentrated industrial fertilizer wastewater using electrolysis, and more particularly nitrophosphate wastewater or wastewater from other mineral or organo-mineral fertilizer processes.

BACKGROUND

Industrial wastewater is one of the important pollution sources of the water environment. During the last century, a huge amount of industrial wastewater was discharged into rivers, lakes and coastal areas. This resulted in serious pollution problems in the water environment and caused negative effects to the eco-system.

There are many types of industrial wastewater based on different industries and contaminants; each sector produces its own particular combination of pollutants. Like the various characteristics of industrial wastewater, the treatment of industrial wastewater must be designed specifically for the particular type of effluent produced.

In many industrial systems, the goal is to reduce the amount of wastewater being discharged into the environment by recirculating the wastewater effluent back into the industrial system itself. Within the fertilizer industry, the nature of the wastewater may vary depending on the type of fertilizer being produced and the specific processes involved.

Mineral fertilisers contain one or more primary (major) nutrients nitrogen (N), phosphorus (P) or potassium (K) in inorganic form or as urea or cyanamide. The primary nutrients N, P, and K are required by plants in large or moderate amounts. Depending on the formulation, mineral fertilisers also contain other nutrients required by plants to a minor degree, such as Ca, Mg, and S. Trace elements required in small quantities are B, Cl, Cu, Fe, Mn, Mo, Zn. Fertilizers are classified in terms of their major nutrient contents: straight fertilisers generally contain only one major or primary nutrient (N, P or K) whereas complex fertilizers contain two or more major nutrients (NP, PK or NPK and more particularly NP or NPK fertilizers).

There are two common processes for producing complex fertilizers, namely the mixed acid process and the nitrophosphate process. In the nitrophosphate process specifically, rock phosphate is initially dissolved in excess nitric acid and $Ca(NO_3)_2 {*} 4H_2O$ is removed from the digested raw phosphate solution by cooling and filtration. Then, by neutralizing the resulting filtrate, a solution containing mainly ammonium nitrate and ammonium calcium phosphates is formed. By evaporation of the solution, an AN-MAP-DCP (ammonium nitrate-monoammonium phospohate-dicalcium phospohate) slurry-melt is formed, to which may be added potassium chloride/potassium sulphate salts. By using these starting components and the described process a large range of fertilizer formulas may be provided upon subsequent particulation of the complex fertilizer solution.

The main effluent components in NP or NPK wastewater are ammonia, nitrate, fluoride, and phosphate, and the wastewater may also contain heavy metals from the phosphate rock, such as Cd, Hg and Zn.

The Austrian Federal Environment Agency issued a report in 2002 entitled *State of the Art for the Production of Fertilisers with Regard to the IPPC Directive*, Monographien Band 105, M-105 (see: http://www.umweltbundesamt.at/fileadmin/site/publikationen/M105.pdf; see also Best Available Techniques for Pollution Prevention and Control in the European Fertilizer Industry, Booklet No. 7 of 8: *Production of NPK Fertilizers by the Nitrophosphate Route*, European Fertilizer Manufacturers' Association, 2000). In the Austrian Report, there is a discussion on specific methods for reducing wastewater emissions and they included the following 7 recommendations as state-of-the-art for the nitrophosphate process specifically:

1. Avoidance of antifoaming agents for the phosphate rock digestions;
2. Recycling of scrubbing liquor arising from treatment of the phosphate rock digestion off-gases into the production process;
3. Recycling of washing water for sand washing into the production process;
4. Avoidance of direct cooling/quenching, e.g. co-condensation of exhaust vapours;
5. Recycling of scrubbing liquor from waste gas scrubbing of the ammoniation into the production process;
6. Combined waste gas scrubbing of the neutralization/evaporation and granulation/drying units; and
7. Application of buffer reservoirs in order to compensate fluctuations of volume and load of the wastewater.

Recommendation 2 is in line with the abovementioned goal to reduce the amount of wastewater discharged into the environment by recirculating the wastewater effluent back into the industrial system itself. It is of benefit to recirculate nitrogen, phosphorous and potassium containing wastewater to a plant producing NPK fertilizers as this reduces the environmental impact and optimizes the quantities of raw materials and water fed to the production process.

Chloride is not typically considered as an important contaminant in the wastewater from fertilizer plants. This may be due to the relatively low levels of chloride seen in fertilizer wastewater which may only be on the order of 1000 ppm. For comparison, drinking water has maximum levels of 250 ppm, whereas salt water contains 35,000 ppm sodium chloride, the chloride portion of which is approximately 21,400 ppm. As such, the levels seen in fertilizer wastewater are not generally considered to be an environmental concern.

However, safety limits must be respected upon recycling fertilizer wastewater back to the fertilizer solution in the production process. Indeed, at the high temperatures of the granulation step or the evaporation step for subsequent prilling, strict chlorine limits must be observed in order to prevent decomposition of ammonium nitrate and related fire and explosion hazards. Consequently, the level of recycling of the wastewater has to be controlled in order for the chlorine levels to stay below safety limits, in the fertilizer solution prior to the particulation stage.

Alternatively, the treatment of the wastewater for chlorine removal will introduce additional flexibility with respect to the volumes of wastewater recycled to the process and/or to the chlorine content of the rock phosphate that is fed to the first step of the process.

The treatment of wastewater containing nitrogen compounds, for removal of the nitrogen compounds, is disclosed in U.S. Pat. No. 6,132,627. Chloride ions are electrolyzed to hypochlorite and the reaction of those hypochlorite ions with the nitrogen compounds results in the production of clean nitrogen gas, $CO_2$, and chloride ions. The chloride ions can be converted to hypochlorite ions by recirculation of the wastewater back to the electrochemical cell.

JPS5113007 discloses a treatment for the wastewater of chemical fertilizer plants in two stages. In a first stage, $CaF_2$ is removed in a first electrochemical cell, by adsorption onto diatomaceous earth activated through preliminary electrolysis. In a second stage, in a second electrochemical cell, amines are converted to chloramines by reaction with chlorine and hypochlorite. Chlorine and hypochlorite are obtained by separate electrolysis of sea water and the resulting electrolyzed water is added to the second electrochemical cell for treating the fertilizer wastewater. In this second cell, electrolysis and adsorption by means of electrolytic active diatomaceous earth promote the stability of chloramines. The two stages of treatment incidentally remove $PO_4$ and $SiO_2$.

WO2017/103041 and WO2017/103042 present methods for treating industrial wastewater and more particularly nitrophosphate fertilizer wastewater or wastewater from other mineral organo-mineral fertilizer processes. Both applications disclose the removal of chloride as chlorine gas by electrolysis of the wastewater. WO2017/103042 further addresses the issue of scaling in the cathode chamber by recirculating the acidic anolyte into the cathode chamber, thereby dissolving the scaling. The applications disclose chloride concentrations as low as 250 ppm after removal from by the electrochemical treatment. WO2017/103042 discloses a Faradaic current efficiency of 8.6%.

Accordingly, there is a need for systems and processes for removing contaminants from waste water from industrial plants, in particular from fertilizer waste water, that are more efficient.

SUMMARY

Described herein is a novel concept for removing contaminants from waste water from an industrial plant, in particular fertilizer plant. It has been found that by concentrating the contaminants in the wastewater prior to the electrolysis step the efficiency of the process can be increased considerably.

According to an aspect of the present application, a method is disclosed for removing a contaminant from waste water from an industrial plant. The method comprises the steps of:

a) concentrating the contaminant in the wastewater;
b) chemically converting the contaminant in the wastewater by electrolysis in particular wherein the contaminant forms a gas upon electrolysis; and
c) recirculating the electrolyzed wastewater to the industrial plant. It has been found that, through the concentration step, the method provides increased efficiency of the electrolysis step.

In a possible method according to the application, the contaminant is chloride and the chloride concentration of the wastewater after the concentrating step is between 1250 and 2250 ppm, more in particular between 1500 and 2250 ppm and more in particular between 1750 and 2250 ppm.

In a possible method according to the application, the step of concentrating the wastewater is performed by a forward osmosis module or a pressure assisted module, comprising a first compartment and a second compartment separated by a membrane.

In a possible method according to the application, the method comprises a further step of directing the wastewater to the first compartment of the osmosis module and the recirculating step comprises the steps of directing the electrolyzed wastewater to the second compartment of the osmosis module and recirculating the wastewater from the second compartment of the osmosis module to the fertilizer plant.

In a possible method according to the application, the flow of the wastewater in the first compartment of the osmosis module is counter-current with respect to the flow in the second compartment of the osmosis module.

In a possible method according to the application, the method comprises a further step of adding a salt solution to or upstream of the second compartment of the osmosis module is comprised.

In a possible method according to the application, the salt solution added to or upstream of the second compartment of the osmosis module comprises one or more of ammonium nitrate, ammonium calcium phosphates and calcium nitrate.

In a possible method according to the application, the industrial plant is a fertilizer plant, in particular a nitrophosphate or another mineral, or organo-mineral fertilizer plant and, more in particular, the industrial plant produces compositions comprising ammonium nitrate.

In a possible method according to the application, the contaminant is chloride and the concentration of chloride in the electrolyzed wastewater is less than 350 ppm.

According to a further aspect of the application, a system is disclosed for removing from waste water from an industrial plant a contaminant present in the waste water. The system may comprise a concentrating unit adapted to be fluidly connected to the wastewater from the industrial plant and an electrochemical treatment unit for removing the contaminant fluidly connected downstream of the concentration unit. The electrochemical treatment unit may comprise an electrolysis unit and may be adapted to be fluidly connected to recirculate the treated wastewater to the industrial plant. The concentrating unit may be a forward or pressure assisted osmosis module and the osmosis module may comprise a first compartment and a second compartment separated by a membrane. The wastewater from the industrial plant to be treated may be fluidly connected to the first compartment. The first compartment may be fluidly connected to an inlet of the electrochemical treatment unit. An outlet of the electrochemical treatment unit may be fluidly connected to the second compartment and the second compartment may be adapted to be fluidly connected to the industrial plant, in particular configured so that wastewater treated in the electrochemical treatment unit can flow though the second compartment and be recirculated to the industrial plant. Optionally, a feed of a salt solution is fluidly connected to the second compartment.

In a possible system according to the application, the system comprises a concentrating unit fluidly connected to the wastewater from the fertilizer plant and an electrochemical treatment unit for removing the contaminant fluidly connected downstream of the concentration unit and fluidly connected to recirculate the treated wastewater to the fertilizer plant.

In a possible system according to the application, the concentrating unit is a forward osmosis module, a pressure assisted osmosis module, a reverse osmosis module, or an electrodialysis module.

In a possible system according to the application, the concentrating unit is a forward or pressure assisted osmosis module comprising a first compartment and a second compartment separated by a membrane. The wastewater from the industrial plant to be treated is fluidly connected to the first compartment, the first compartment is fluidly connected to the electrochemical treatment unit and the treated wastewater is fluidly connected to the second compartment and flows through the second compartment to be recirculated to the industrial plant. Optionally, a feed of salt solution is fluidly connected to the second compartment.

In a possible system according to the application, the concentrating unit comprises more than one osmosis module, in particular two or three osmosis modules, connected in series.

In a possible system according to the application, the wastewater flow in the first compartment of the osmosis module flows counter-currently with respect to the flow of the water in the second compartment of the osmosis module.

According to a further aspect of the application, disclosed is the use of the system according to the second aspect of the application in a fertilizer plant in particular a nitro-phosphate fertilizer plant, or another mineral or organo-mineral fertilizer plant, more in particular a fertilizer plant producing compositions comprising ammonium nitrate.

DETAILED DESCRIPTION

Figure 1:
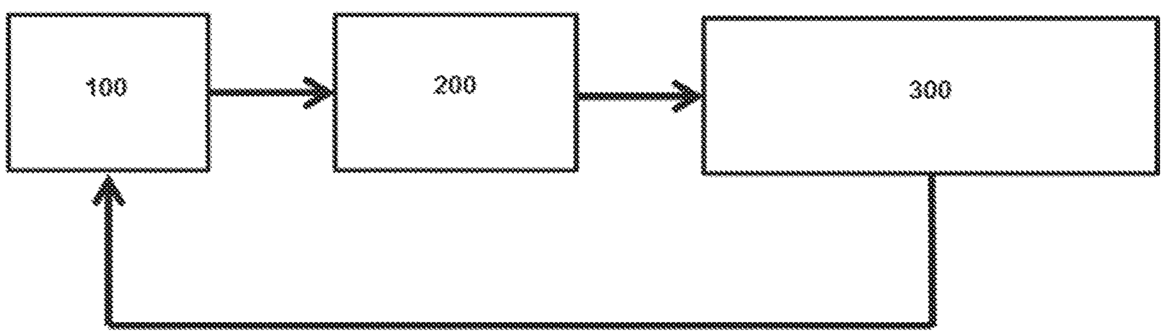
FIG. 1 illustrates a schematic method for concentrating, electrolyzing and recirculating fertilizer wastewater.

Throughout the description and claims of this specification, the words "comprise" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the application are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The application is not restricted to the details of any foregoing embodiments. The application extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the application disclosed herein. It should be understood that the value to which the term "approximately" refers per se has also been disclosed.

The term "between" as used when referring to a range for a measurable value, such as a parameter, an amount, a time period, and the like, is intended to include the limits associated to the range that is disclosed.

All references cited in this description are hereby deemed to be incorporated in their entirety by way of reference.

The reader's attention is directed to all papers and documents which are filed concurrently with or previous to this specification in connection with this application and which are open to public inspection with this specification, and the contents of all such papers and documents are incorporated herein by reference.

The invention is described in detail below for the removal of chloride from fertilizer waste water through formation and removal of chlorine gas from the wastewater. However, the present application can be applied to the removal from any industrial wastewater of any contaminant that can be chemically converted by electrolysis, in order for the wastewater to be recycled back to the industrial plant. Such contaminants are found, for example, in streams including but not limited to, brines which are found in uranium processing, and sodium sulphate electrolysis. Examples 3 and 4 describe such applications for non-fertilizers wastewater or recycle streams and Example 6 also describes the increase in the Faradaic current efficiency due to preconcentration. In particular, the contaminant forms a gas and is removed in the gas phase during the electrolysis step.

As defined herein, the Faradaic current efficiency is defined as the percentage of the current provided to the electrolysis cell that is used for converting the contaminant.

As used herein, the term "electrochemical treatment unit" refers to a unit wherein electrochemical reaction may take place, preferably the electrochemical reaction is electrolysis.

As used herein, the term "electrolysis unit" refers to a unit comprises an electrolysis cell wherein electrolysis may take place.

Chloride can be seen in fertilizer wastewater, particularly wastewater from the nitrophosphate, organic or organo-mineral process. Without being bound by theory, the chloride may have originated from the phosphate rock, depending on the source of phosphate rock. This impurity may be present in only modest concentrations on the order of 1000 ppm. If the wastewater is merely released into the environment, this level of chloride may not present any environmental or regulatory concern. However, if the wastewater is then recirculated back into the fertilizer plant, then chloride when present even in modest amounts can destabilize ammonium nitrate which can become explosive and present a significant safety concern. More particularly, in the process of producing, for example, NPK granules, water is evaporated and in doing so, the local concentration of any chloride present can increase substantially. Since ammonium nitrate would also be present, the combination can then become explosive.

The use of electrolysis for removing chloride from the wastewater from a fertilizer plant has been described in the applications WO2017/103041 and WO2017/103042. After the wastewater is electrolyzed and the chloride concentration reduced to suitable limits, the electrolyzed wastewater is recirculated to the fertilizer plant.

Electrolysis is a well-known technique and the following discussion on the reactions at the electrodes, as well as the nature of potential electrodes and electrolytes are not meant to limit the generality of the technique to the skilled person.

As mentioned above, wastewater streams with low levels of chlorides can have particular advantages in relation to the nitrophosphate, other mineral or organo-mineral fertilizer processes, and even more particularly when the wastewater is recirculated back to the fertilizer plant as in the present application.

Electrolysis of the concentrated wastewater can be used to bring the chloride concentration to levels lower than 500 ppm and more particularly lower than 350 ppm, and even more particularly lower than 250 ppm. All chloride levels indicated in the remaining of this application were measured according to the ASTMD512-12 standard, the potentiometric silver nitrate titration with an ion selective electrode.

The electrolysis may be performed at elevated temperatures. The anolyte and/or the catholyte may have a temperature over 20° C. In particular, the anolyte and/or the catholyte may have a temperature over 30° C. In particular, the anolyte and/or the catholyte may have a temperature over 40° C. In particular, the anolyte and the catholyte may have a temperature in the range of 30 to 80° C. Temperatures in excess of the atmospheric boiling point of the solution could be used if the method is performed under increased pressure. Operation at higher temperature may facilitate removal of chlorine from a solution which produces chlorine during electrolysis. Operation at increased pressure may reduce the size of any gas treatment equipment.

Treatment of the concentrated effluent from the nitrophosphate, other mineral or organo-mineral fertilizer plant in the electrochemical cell effects the removal of chloride. Chloride is oxidized to chlorine at the anode and is liberated as chlorine gas. The oxidation of chloride to chlorine competes with oxidation of water to oxygen. The relative rate of oxidation of chloride to chlorine compared to oxidation of water is favoured by increasing the concentration of the chloride. For this reason, the economics of the process may be favoured by pre-concentration. After evolution in the cell, the chlorine gas may be separated from the liquid leaving the cell and may then be removed in an off-gas scrubber prior to release of any remaining harmless gases to the atmosphere together with produced oxygen. Alternately, the scrubbed gas, which may contain components such as hydrogen may be used as make-up gas for combustion devices. Further still, if the gas is used for make-up air in combustion equipment, and if that combustion equipment is suitably equipped with a device for scrubbing of acid gases, then the gases might be sent directly to the combustion equipment.

Suitable off-gas systems which may be used to scrub the liberated chlorine may, for example, use NaOH as the scrubbing agent. This would then produce NaCl and NaClO, which may be re-used as a decontamination agent or discharged to the sea after conversion of NaClO to NaCl using, for example, sodium thiosulfate or sodium bisulphite. Solid state scrubbers can also be employed or a mixture of Cl2, O2, and H2 gases can be burned in a controlled manner as described above.

While oxygen and chlorine are evolved at the anode, typically, the cathode reaction involves the release of hydrogen gas. It is generally beneficial to separate the anode and cathode reactions through the use of a porous separator (diaphragm) or ion selective membrane (porous or ion selective). This may have multiple beneficial results including:

1. Preventing parasitic redox couples (e.g. $Fe^{2+}/Fe^{3+}$ and $N_3^-/NO_2^-$) by reducing the Faradaic current efficiency;
2. Keeping metal ions away from the cathode in order to minimise the risk of electro-deposition;
3. Separating gas streams (i.e. chlorine/oxygen evolving from the anode and hydrogen at the cathode) for safety reasons and for eventual after-treatment, since mixing of the gas streams can result in an explosive mixture or form hazardous components (this applies to both mixtures of hydrogen and oxygen as well as mixtures of hydrogen and chlorine); and
4. Preventing the products from reacting with each other.
5. While a typical cell separates the anolyte and catholyte compartments by a microporous separator or membrane, an undivided cell may also be used for the purpose of the present application. This alternative approach provides the benefit of a simpler cell design with only one fluid circuit and, of course, removes the requirement for a separator. However, it does not possess the benefits presented above.

For removal of chloride, in the context of wastewater treatment, more particularly from the nitrophosphate, other mineral or organo-mineral process, the anolyte is the effluent from the process. The wastewater may be concentrated through a concentration step prior to entering the electrochemical cell where it becomes the anolyte. The catholyte may also be the effluent from the wastewater or a concentrated salt solution, after treatment in the anolyte side of the cell, an acid solution such as nitric acid, water or another appropriate solution chosen by a skilled person.

The anode material of the cell should be stable in the electrolyte. In addition, the material should be suitable for both oxygen and chlorine evolution and demonstrate low wear rates for both reactions, as well as low over potentials for chlorine evolution. Typical materials for use as anode materials include boron-doped diamond, coated titanium (coated with oxides of metals, e.g. iridium oxide, mixed iridium/ruthenium oxide and tin oxide), carbon (graphite) and bulk platinum. In general, for chlorine evolution, electrodes known from the chlor-alkali industry might be used such as a DSA™ electrode from Permascand.

The selection of materials for the cathode materials requires stability in the electrolyte and ideally a low overpotential for the generation of hydrogen. Stability is often not a problem when the material is cathodically protected, as during operation, but the material must also be stable on shutdown. In this context, stainless steel may be suitable and reasonably inexpensive, but this in no way limits the number of available materials, and a wide range of other materials which would be readily apparent to a person skilled in the art may also be employed for this purpose.

Typical separators or diaphragms are polymeric in nature and may comprise any of a number of commercially available alternatives which would be apparent to a skilled person. The separators may be either diaphragms, which provide physical separation but do not selectively transport either anions or cations, or ion exchange membranes. Common examples of diaphragms include, for example, asbestos or microporous polypropylene. A suitable separator may also be a PMX® diaphragm from De Nora. An example of an ion exchange membrane separator is Nafion® (sulphonated tetrafluoroethylene based fluoropolymer copolymer) which is a cationic selective membrane. In particular, separators developed for the chlor-alkali industry may be beneficially used. The membranes used in the chlor-alkali industry are commonly made of perfluorinated polymers and are resistant to chlorine oxidation. The membranes may have one or more layers, but generally, consist of two layers in chlor-alkali applications. One of these layers consists of perfluorinated polymer with substituted carboxylic groups and is adjacent to the cathodic side. The other layer consists of perfluorinated polymer with substituted sulphonic groups and is adjacent to the anodic side. To give the membrane mechanical strength, the membrane may be reinforced with PTFE fibres.

At the anode, in the case of dechlorination, the reaction can be broken down into several discrete steps:

1. transport of the chloride by diffusion, migration or convection from the bulk solution to the surface of the electrode (mass transport);
2. desolvation of the solvated chloride
3. oxidation of the chloride ion on the anode surface (charge transfer)
4. evolution of the chlorine gas.

In the electrolysis of chloride from industrial effluent from the fertilizer industry, and more particularly where the nitrophosphate, other mineral or organo-mineral process is used, the first step, namely the mass transport may be the limiting step. This is due to the relatively dilute chloride concentrations that are present which are typically on the order of only 1000 ppm. As noted previously, the mass transfer limitation may be reduced by increasing the concentration of the species which needs to be transported, in this case, the chloride ion.

For safety reasons when recirculating wastewater back to a nitrophosphate fertilizer plant, lower ultimate levels of dissolved chlorine either in elemental or ionic forms would be better. Nevertheless, for most practicable purposes a level of lower than 500, more particularly lower than 350 ppm would normally be considered acceptable. Even lower levels may be obtained, such as below 250 ppm, below 200 ppm, or below 150 ppm. These levels can be achieved more economically by removing water from the feed, treating a more concentrated feed electrochemically, and then recombining water and treated feed.

It has been found that an additional step of concentrating the wastewater prior to the electrochemical treatment results in improved Faradaic current efficiency of the electrochemical treatment by reducing mass transfer and kinetic limitations. In some embodiments, the electrochemical treatment unit comprises an electrolysis unit. A designer may utilize this finding either by operating a smaller, lower capital cost electrolysis cell at higher current density or by operating a larger low-current density cell with higher coulombic and voltaic efficiency. For the case of chloride oxidation, the current necessary for converting chloride ions into chlorine gas can be reduced by supplying the cell with a higher inlet chloride concentration. Such reduction of the electrode surface in the electrochemical cells presents the major advantages of reducing both the costs associated with the electrodes and the footprint of the electrochemical cell. In addition the operating cost is reduced.

Any concentration technique known to the skilled in the art and suitable for concentrating a fertilizer solution can be beneficially used to concentrate a system ahead of an electrochemical treatment process. Evaporation, electrodialysis, reverse osmosis and forward osmosis are examples of such concentration techniques.

In a particular embodiment according to this application, the osmosis module is a forward osmosis module or a pressure assisted osmosis module. In a chemical process or wastewater treatment process in which the concentration of salts in the streams entering and leaving the process are different, either by virtue of the process itself, or by the desire to add a reagent, opportunities exist to transfer water between entering and leaving streams utilizing the osmotic pressure difference between the two streams. This can be used to beneficially concentrate the feed to the process and allow intensification of the process. This is particularly the case when the process operates more efficiently with an increased feed concentration. If the product stream is inherently more concentrated, by virtue of the process, then forward osmosis can be used to concentrate the feed by drawing water into the product. The forward osmosis process does not change the overall amount of water leaving the process. If the wastewater treatment is achieved through electrolysis, forward osmosis removes the requirement to handle all of the water in the electrochemical cell. Even if the stream leaving the process is not significantly different in concentration from the feed, there are still be significant benefits to exchanging water between the inlet and feed, for example by using the product as a "sweep stream" on what would traditionally be the permeate side of a reverse osmosis system. Water can be transported from feed to sweep side at significantly reduced pressure than would be needed to overcome the full osmotic pressure and produce pure water as permeate. This is referred to as pressure assisted osmosis. Relative to other concentration processes such as evaporation or electrodialysis, osmosis based processes, reverse osmosis, forward osmosis and pressure assisted osmosis may offer lower capital and operating costs.

In particular, in the production of a nitrophosphate fertilizer, and for feeding of wastewater to an electrochemical cell to remove chloride from this wastewater, the total dissolved salt concentration is between 40 g/l and 100 g/l. In some embodiments, the electrochemical cell is an electrolysis cell. The chloride concentration is between 1250 ppm and 15000 ppm, or between 1500 ppm and 10000 ppm, or between 1750 ppm and 2500 ppm. It has been found that the efficiency of the decontamination process can be increased by concentrating the waste stream to a higher degree. After electrochemical processing of this stream the total dissolved salt concentration is only marginally increased to between 41 g/l and 105 g/l, the increase being due to electrolysis and evaporative losses, and the chloride concentration is reduced to below 350 ppm, or below 250 ppm, or below 200 ppm, or below 150 ppm. The treated solution leaving the cell is then introduced back into the process. In particular, components such as calcium nitrate are added to the treated solution which are needed in the downstream process. This stream is suitable to use as a draw stream for forward osmosis to remove water from the feed stream to the cell. It may similarly be used for pressure assisted osmosis, to reduce the pressure requirement compared to traditional reverse osmosis, if it is not suitable enough—that is requiring too much energy—for forward osmosis. In either case, it may to possible to provide an energy efficient concentration ahead of the electrochemical cell using variants of osmosis.

In a particular embodiment, the concentration step concentrates the contaminant in the wastewater prior to the electrolysis, in particular in an amount of more than 10%, more in particular more than 20%, more in particular more than 25%, more in particular more than 50%, more in particular more than 75%, more in particular more than 100%, more in particular more than 125%, or more in particular more than 150%.

With reference to the figures, various exemplary aspects of the system and method described herein are detailed below.

Figure 2A:
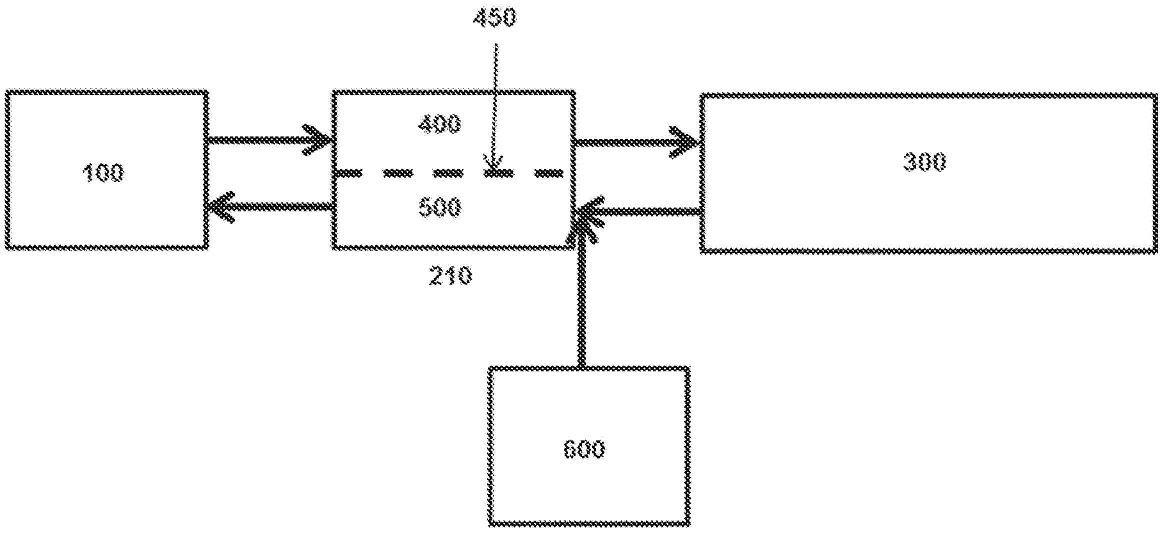
FIGS. 2A and 2B illustrate a schematic method for concentrating, through an osmosis unit, electrolyzing and recirculating fertilizer wastewater.

FIG. 1 is a general schematic of the process whereby wastewater from fertilizer plant 100 is first concentrated in concentrator 200. Chloride from the wastewater is then removed in electrochemical treatment unit 300 before the wastewater is recirculated to fertilizer plant 100. In a more particular embodiment as illustrated in FIG. 2A, the concentrator 200 is a forward osmosis module 210. The forward osmosis module 210 comprises a first compartment 400 and a second compartment 500, separated by a membrane 450. Because the stream in compartment 500 is similar in composition and concentration to stream 400, no pressure driving force, and therefore less energy, is required for removal of water from stream 400 for the forward osmosis process as compared to the reverse osmosis process. For example, the forward osmosis module may be an Aquaporin INSIDE™ osmosis module.

It has been found that, due to the removal of water by electrolysis and evaporation of water into the gas phase during the electrolysis step, the wastewater exiting the electrochemical treatment unit 300 is naturally more concentrated than the water entering the cell. Consequently, in a forward osmosis process, the water will naturally flow from the first compartment 400 to the second compartment 500. This driving force may be low because the amount of water removed by electrolysis and evaporation is small compared to the total amount of water flowing through the system. Nevertheless, it may contribute to the osmotic imbalance between the two sides of the cell, 400 and 500.

The concentrating step described herein will not specifically concentrate the chloride ions in the wastewater but all ions present in the wastewater. This concentration step is not to be interpreted as a sole chloride purification step. Moreover, the concentration of other ions present in the wastewater may have no material effect on the efficacy of the chloride removal in the electrochemical treatment unit 300.

In the embodiment shown in FIG. 2A, the wastewater is concentrated by directing the wastewater to the first compartment 400 of the forward osmosis module 210 and the electrolyzed water is directed to the second compartment 500 of the forward osmosis module 210. The wastewater is then recirculated from the second compartment 500 of the forward osmosis module 210 to the fertilizer plant 100.

Consider a demonstration plant treating 250 l/hr of wastewater which may be directed to the first compartment of the osmosis module. The flow is preferentially at a temperature between 25 and 60° C. as determined by the temperature limits of the osmosis system. In particular, the flow of saturated water to the second compartment, returning from the cell is between 250 and 100 l/hr, representing an osmotic concentration and a volume reduction in water in the feed of 2.5 times. Pumps (not shown) may be used as necessary to ensure the proper flow of wastewater throughout the system.

In the embodiment illustrated in FIG. 2A, the flow of the wastewater in the first compartment 400 is counter-current with respect to the flow in the second compartment 500. The concentration gradients in each compartment will be more favorable in performing the concentration step when such counter-current flow profile is operated. However, forward osmosis can also be used with co-current flow. In typical designs chloride can be concentrated from approximately 1000 ppm 2500 ppm or considered alternately by a factor of 2.5 times. This should not be considered a theoretical limit on the amount of concentration which can be performed. This will depend upon the solution to be concentrated, the mode of contacting, concurrent or countercurrent, the specifics of the contacting equipment, and the tendency of the solution to foul the osmosis membranes by precipitation. In general, the process will benefit by concentrating a solution as much as possible until a practical limit such as solubility is reached.

In particular, fertilizer plant 100 is a fertilizer plant producing compositions comprising ammonium nitrate. Chloride removal will be necessary when such compositions are produced, in order to ensure recycling of safe and acceptably low levels of chlorine to fertilizer plant 100. In particular, the concentration of chloride in the electrolyzed water recycled to the fertilizer plant 100 through the second compartment 500 is less than 350 ppm.

The concentration step is further improved upon adding a salt solution to the second compartment 500 of the osmosis module 210 from salt reservoir 600, as shown in FIG. 2A. The addition of such a salt solution to the second compartment 500 will increase the osmotic pressure and will, thereby further drive the flow of water molecules from the first compartment 400 to the second compartment 500. Without being bound by theory, any salt solution may be used for increasing the osmosis pressure. In turn, an increased osmotic pressure will reduce the size of the concentration step. In a particular embodiment, the salt solution from salt reservoir 600 is a fertilizer solution essentially free of chloride. As defined herein, essentially free of chloride means less than 500 ppm, more particularly lower than 350 ppm and even more particularly even lower levels, such as below 250 ppm, below 200 ppm, or below 150 ppm. Those low levels of chloride ions will prevent any safety hazard in the downstream fertilizer process.

More particularly, in each case, the fertilizer plant 100 to which the electrolyzed water is recycled is an ammonium nitrate plant and the salt solution from salt reservoir 600 is an ammonium nitrate salt solution. More particularly, the fertilizer plant 100 to which the electrolyzed water is recycled is a nitro-phosphate or other organo-mineral fertilizer plant and the salt solution from salt reservoir 600*s* a fertilizer solution comprises mainly ammonium nitrate, ammonium calcium phosphates or calcium nitrate or a combination thereof. In this manner, part of an existing feed of the process can be utilized as the feed of saturated solution to the second compartment 500 of the osmosis module 210. Nevertheless, any salt solution could be used to increase the osmotic pressure across membrane 450. The only real restriction on the selection of an appropriate salt solution is that any salt should be essentially free of chloride. In this context, essentially free means that there is less chloride present in the salt solution as would be present in the wastewater after the electrolysis step. In other words, the salt solution should not be providing additional chloride back to the wastewater. Accordingly, in some embodiments, the salt solution from salt reservoir 600 contains less than 500 ppm, more particularly less than 350 ppm, less than 250 ppm, less than 200 ppm or even less than 150 ppm of chloride.

Figure 2B:
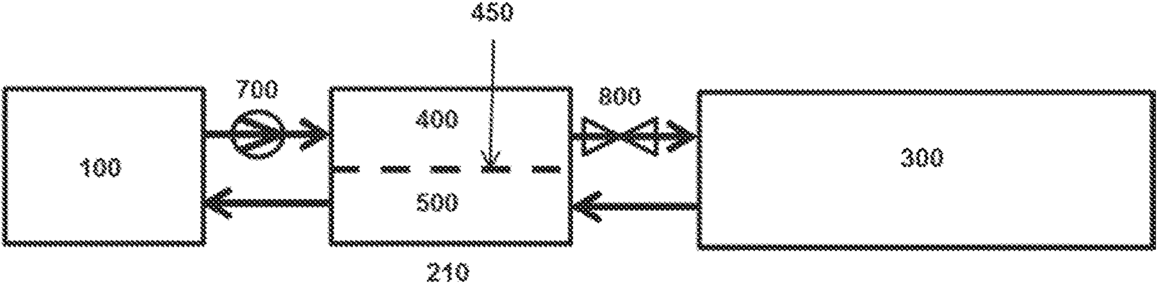

In a different embodiment, shown in FIG. 2B, the forward osmosis module shown in FIG. 2A is replaced by a pressure assisted osmosis module. This requires a pump 700 and a back pressure valve 800 but substantially reduces the pressure required for osmosis by using the product stream as a draw in compartment 500. It also permits the processing of more concentrated streams than could generally be processed by reverse osmosis by reducing the pressure required to drive fluid across the membrane.

Figure 3:
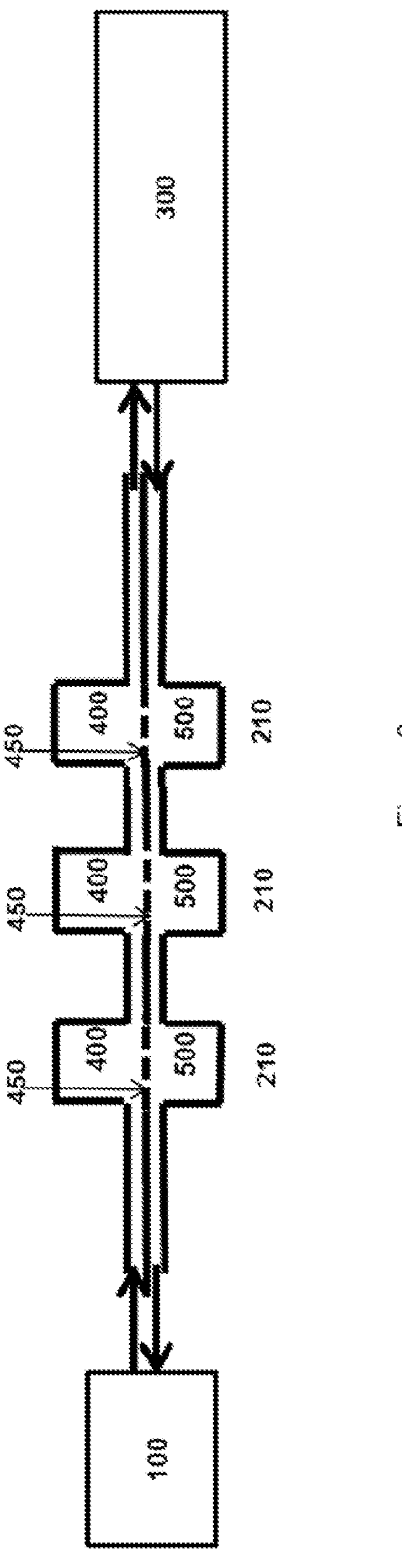
FIG. 3 illustrates a schematic multi-stage osmosis module for concentrating fertilizer waste water prior to electrochemical treatment and for recirculating the wastewater following the electrochemical treatment.

In a particular embodiment, the concentrating unit 200 can include multiple forward osmosis modules 210 connected in series, for example, 2 or 3 forward osmosis modules. FIG. 3 is an illustration of such an embodiment containing 3 forward osmosis modules 210 connected in series and each comprising a first compartment 400 and a second compartment 500 separated by a membrane 450. The wastewater is subsequently treated through the electrochemical treatment unit 300. As discussed above, the flow of the wastewater in the first compartments 400 can be counter-current with the flow in the second compartments 450 as shown in FIG. 3 or the flow can be co-current.

EXAMPLES

Note: as mentioned in the detailed description, all chloride levels further indicated in the following examples were measured according to the ASTMD512-12 standard, the potentiometric silver nitrate titration with an ion selective electrode.

Example 1—Reference, No Forward Osmosis Draw

A divided electrochemical cell was equipped with an anode which was a dimensionally stable anode from Permascand, and the cathode was SS 316 stainless steel. The membrane separator was Nafion 324. A chloride selective electrode was used on the anolyte samples to measure chloride concentration over the duration of the experiment. The construction material of the cell was PVC.

Wastewater from Porsgrunn comprising 1100 ppm chloride with a weight percentage of dissolved solids of 5.1% comprising primarily of ammonium nitrate, was added to the anode chamber of an electrochemical cell and the pH was adjusted down to 2.0 with nitric acid. A catholyte solution of sodium sulphate was prepared and pH adjusted down to 0.5 with nitric acid such that it had the same ionic strength as the wastewater to minimize osmotic water transfer in the cell. This solution was then added to the cathode compartment of the cell.

The cell was operated with a current density of 860 A $m^{-2}$ in a batch-wise mode. The experiment was performed at room temperature. Calculations showed that the Faradaic current efficiency was approximately 8% for chloride removal down to 200 ppm over 115 minutes.

Example 2—without Feed of Calcium Nitrate for Forward Osmosis Draw

A divided electrochemical cell was equipped with an anode which was a dimensional stable anode from Permascand, and the cathode was SS 316 stainless steel. The membrane separator was Nafion 324. A chloride selective electrode was used on the anolyte samples to measure chloride concentration over the duration of the experiment. The construction material of the cell was PVC. The wastewater stream according to example 1 was first directed at a flow rate of 1.1 L/min to the tube-side inlet of an Aquaporin Module comprising a tube and shell compartment where the tubes are made of a water-permeable membrane. This Aquaporin INSIDE™ module was a tube-in-shell forward osmosis unit with a 2.3 $m^2$ membrane area. The chloride concentration of the wastewater exiting the tube-side was 1470 ppm and the weight percentage of the solids in this exiting solution, at the outlet of the first compartment was 7.4%. This outlet wastewater was collected at a rate of 0.8 L/min. The draw stream fed to the shell of the Aquaporin module was a "simulated" strengthened solution which would be returned from the electrochemical cell after the chloride was removed. This "simulated" wastewater had a solids weight percentage of 14% ammonium nitrate with 0 ppm of chloride. It was fed to the shell at 0.9 L/min. The outlet stream from the shell had a weight percentage of solids of 10.3%, contained 26 ppm of chloride, and was collected at 1.2 L/min.

The concentrated wastewater was added to the anode chamber of an electrochemical cell and the pH was adjusted down to 2.0 with nitric acid. A catholyte solution of sodium sulphate was prepared and pH adjusted down to 0.5 with nitric acid such that it had the same ionic strength as the wastewater to minimize osmotic water transfer in the cell. This solution was then added to the cathode compartment of the cell.

The cell was operated with a current density of 860 A $m^{-2}$ in a batch-wise mode. The experiment was performed at room temperature. Interpolating from experimental results, the Faradaic current efficiency was approximately 25% for chloride removal from 1470 ppm down to 400 ppm over 120 minutes. If this solution were then diluted in a forward osmosis module as the draw stream (as in FIG. 2A) to a solids content from Example 1 of 5.1% solids, the chloride level would be below 200 ppm, equivalent to the result from Example 1 in which no concentration step was performed prior to the electrolysis step.

This experiment represented a potential single stage in a counter-current cascade forward osmosis system that would bring the typical wastewater from 1100 to 2000 ppm of chloride to operate the electrochemical cell at a higher Faradaic current efficiency. After chloride removal in the electrochemical cell, the stream could be re-used as a draw stream for the FO system, because it will be slightly concentrated due to evaporation and water loss from electrolysis.

Example 3—with Addition of Calcium Nitrate for Forward Osmosis Draw

A divided electrochemical cell was equipped with an anode which was a dimensionally stable anode from Permascand, and the cathode was SS 316 stainless steel. The membrane separator was Nafion 324. A chloride selective electrode was used on the anolyte samples to measure chloride concentration over the duration of the experiment. The construction material of the cell was PVC.

To demonstrate that the strengthened wastewater stream used in the above test could be generated with a forward osmosis system, wastewater at 25° C. from Porsgrunn comprising 1100 ppm chloride with a weight percentage of solids of 5.1% was directed at a flow rate of 1.1 L/min to the tube-side inlet of an Aquaporin Module comprising a tube and shell compartment where the tubes are made of a water-permeable membrane. This Aquaporin INSIDE™ module was a tube-in-shell forward osmosis unit with a 2.3 $m^2$ membrane area. The chloride concentration of the wastewater exiting the tube-side was 1470 ppm and the weight percentage of the solids in this exiting solution, at the outlet of the first compartment was 7.4%. This outlet wastewater was collected at a rate of 0.8 L/min. The draw stream fed to the shell of the Aquaporin module was a "simulated" strengthened solution which would be returned from the electrochemical cell after the chloride was removed. This "simulated" wastewater had a solids weight percentage of 14% ammonium nitrate with 0 ppm of chloride. It was fed to the shell at 0.9 L/min. The outlet stream from the shell had a weight percentage of solids of 10.3%, contained 26 ppm of chloride, and was collected at 1.2 L/min.

The concentrated wastewater was added to the anode chamber of an electrochemical cell and the pH was adjusted down to 2.0 with nitric acid. A catholyte solution of sodium sulphate was prepared and pH adjusted down to 0.5 with nitric acid such that it had the same ionic strength as the wastewater to minimize osmotic water transfer in the cell. This solution was then added to the cathode compartment of the cell.

The cell was operated with a current density of 860 A $m^2$ in a batch-wise mode. The experiment was performed at room temperature. Calculations showed that the Faradaic current efficiency was approximately 25% for chloride removal down to 400 ppm over 120 minutes; If this solution were then diluted in a forward osmosis module as the draw stream (as in FIG. 2A) to a solids content from Example 1 of 5.1% solids, the chloride level would be below 200 ppm, equivalent to the result from Example 1 in which no concentration step was performed prior to the electrolysis step.

This experiment represented a potential single stage in a counter-current cascade forward osmosis system that would bring the typical wastewater from 1100 to 2000 ppm of chloride to operate the electrochemical cell at a higher Faradaic current efficiency. After chloride removal in the electrochemical cell, the stream could be dosed with calcium nitrate—a salt used downstream in a typical nitrophosphate fertilizer process—before being used as a draw stream for the forward osmosis system. This stream would now have a significantly higher ionic strength compared to the feed stream and would reduce the membrane area required for the forward osmosis system.

Note Concerning the Examples 4-6:

Not to be limited to the specific treatment of chloride-containing wastewater from nitrogenous fertilizer plants, the inventors suggest other applications of the concepts embodied in this patent, which are outside this specific field. These are described below as examples 4, 5, and 6.

Example 4—Electroreduction of Ferric Iron to Ferrous Iron for Uranium Extraction from Phosphoric Acid U.S. Pat. No. 8,703,077 B2 describes a process for extraction of uranium from phosphoric acid. The process uses iron exchange or solvent extraction to remove the uranium from a phosphoric acid stream which is then returned to process. Iron in the ferric state, which is present in the acid together with the uranium, competes with the uranium for sites on the ion exchange resin or in the solvent extraction. Electroreduction of ferric iron to ferrous iron, which does not compete with uranium in the Ion exchange/solvent extraction process, is presented as one option to improve the performance of the uranium extraction process. The Faradaic current efficiency of this electroreduction process will be limited by competition of reduction of ferric to ferrous with evolution of hydrogen due to the low concentration of iron in the acidic solution. Osmotic concentration of the solution feeding the cell, either by forward or assisted osmosis, using the treated stream as a draw, will benefit the process by raising the concentration of ferric iron in the feed, and raising the Faradaic current efficiency.

Example 5—Electrochemical Salt Splitting of Brines Produced in Oil and Gas Applications The oil and gas sector is facing increasing pressure to properly handle "produced water". This is a saline stream which is extracted together with the hydrocarbon. It contains primarily sodium chloride at a concentration which may be up to approximately 5 wt % salt. More typically the concentration is closer to seawater, approximately 3.5 wt % NaCl.

One approach to handling the produced water, and to extracting value, is to electrochemically salt split the brine to produce sodium hydroxide and hydrochloric acid. Both chemicals can be required at many oil and gas sites. The extraction of the salt desalinates the water and simplifies the reuse. Either an electrolysis or a bipolar membrane electrodialysis cell can be used for the salt splitting The process of electrochemical salt splitting is made more efficient by working with the strongest available brine. Also, water addition is required in the anolyte and catholyte compartments of the electrochemical cell to maintain the concentration of these products. Forward osmosis between the products and the feed solutions, as detailed in this patent, is suited to reducing the power consumption of the overall process by economically concentrating the feed stream, while maintaining the anolyte and catholyte concentrations by dilution using the water extracted from the feed.

Example 6—Acid Pre-Concentration in 3-Compartment Electrochemical Salt Splitting Process Sodium sulphate can be split electrochemically in a 3 compartment cell. The sodium sulphate solution flows into the center compartment where sodium ions pass through a cation exchange membrane into the catholyte compartment, and sulphate ions pass through an anion exchange membrane into the anolyte. Due to the mechanism of transfer through the membranes, there is significant water transfer (roughly 12-15× mol $H_2O$/mol $Na_2SO_4$) out of the center compartment into the anolyte and catholyte compartments. To minimize voltaic losses in the center compartment, this stream would not run to full depletion but be recycled back to the solid dissolution stage of the process. Additional water would be required to make up for the lost water across the membranes.

The sulfuric acid concentration in the anolyte compartment cannot be economically operated above approximately 2.0 mol/L without losses in the Faradaic current efficiency due to back-migration through the membrane. The acid stream would subsequently be concentrated in various stages up to, for example, 98 wt %. Since the center compartment (with the sodium sulphate) can be operated close to the solubility limit (roughly 2.6 mol/L), there is an ionic gradient between the two streams that could be utilized in a forward osmosis system to remove water from the product acid stream and added to the recycle sodium sulphate stream for the dissolution of fresh solid sodium sulphate. This approach would be an energy efficient process for the initial concentration of the product sulphuric acid and could additionally increase the Faradaic current efficiency by operating at a lower acid concentration in the anolyte compartment.

The invention claimed is:

1. A system for removing a contaminant from wastewater from an industrial plant comprising:

a) a concentrating unit adapted to be fluidly connected to the wastewater from the industrial plant, b) an electrochemical treatment unit for removing the contaminant fluidly connected downstream of the concentrating unit and adapted to be fluidly connected to recirculate treated wastewater to the industrial plant, wherein the concentrating unit is a forward or pressure assisted osmosis module, the forward or pressure assisted osmosis module comprising a first compartment and a second compartment separated by a membrane, wherein:

i) the wastewater from the industrial plant to be treated is fluidly connected to the first compartment;

ii) the first compartment is fluidly connected to an inlet of the electrochemical treatment unit;

iii) an outlet of the electrochemical treatment unit is fluidly connected to the second compartment and the second compartment is adapted to be fluidly connected to the industrial plant;

iv) a salt reservoir comprising a feed of a salt solution is fluidly connected to the second compartment; and y) the electrochemical treatment unit comprises an electrolysis unit.

2. The system according to claim 1 wherein the concentrating unit comprises more than one osmosis module connected in series.

3. The system according to claim 1 wherein wastewater flow in the first compartment flows counter-currently with respect to flow of water in the second compartment.

4. The system according to claim 2 wherein two or three osmosis modules are connected in series.

5. An industrial plant comprising the system of claim 1 wherein the wastewater treated in the electrochemical treatment unit flows through the second compartment and is circulated to the industrial plant.

* * * * *